(12) United States Patent
Ueno

(10) Patent No.: US 9,391,895 B2
(45) Date of Patent: Jul. 12, 2016

(54) NETWORK SYSTEM AND SWITCHING METHOD THEREOF

(75) Inventor: Hiroshi Ueno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 14/005,236

(22) PCT Filed: Jan. 18, 2012

(86) PCT No.: PCT/JP2012/050986
§ 371 (c)(1),
(2), (4) Date: Sep. 13, 2013

(87) PCT Pub. No.: WO2012/127894
PCT Pub. Date: Sep. 27, 2012

(65) Prior Publication Data
US 2014/0010235 A1    Jan. 9, 2014

(30) Foreign Application Priority Data
Mar. 18, 2011   (JP) .................................. 2011-060389

(51) Int. Cl.
*H04L 12/28* (2006.01)
*H04L 12/741* (2013.01)
*H04L 12/26* (2006.01)

(52) U.S. Cl.
CPC ............ *H04L 45/745* (2013.01); *H04L 43/024* (2013.01); *H04L 43/026* (2013.01)

(58) Field of Classification Search
None
See application file for complete search history.

(56) References Cited

U.S. PATENT DOCUMENTS

| | | | |
|---|---|---|---|
| 6,975,592 B1 * | 12/2005 | Seddigh et al. | 370/230 |
| 8,593,958 B2 * | 11/2013 | Zhang | H04L 43/026 370/230.1 |
| 2002/0191543 A1 * | 12/2002 | Buskirk et al. | 370/230.1 |
| 2005/0013300 A1 | 1/2005 | Akahane et al. | |
| 2006/0182034 A1 * | 8/2006 | Klinker et al. | 370/238 |
| 2007/0076606 A1 * | 4/2007 | Olesinski et al. | 370/230 |
| 2007/0140128 A1 * | 6/2007 | Klinker et al. | 370/238 |
| 2007/0271374 A1 | 11/2007 | Shomura et al. | |
| 2012/0020361 A1 * | 1/2012 | Ueno | 370/400 |
| 2013/0304915 A1 * | 11/2013 | Kawai | H04L 43/026 709/224 |

FOREIGN PATENT DOCUMENTS

EP   1 764 951 A1    3/2007
JP   2007-336512 A   12/2007

(Continued)

OTHER PUBLICATIONS

European Search Report dated Jul. 24, 2014.

(Continued)

*Primary Examiner* — Michael J Moore, Jr.
(74) *Attorney, Agent, or Firm* — McGinn IP Law Group PLLC

(57) ABSTRACT

A network system of the present invention includes a switch and a controller. The controller sets a flow entry, in which are defined a rule and an action used to uniformly control a packet as a flow, in a flow table of the switch. The switch determines whether or not to perform a sampling processing to a received packet, in accordance with the flow table setting, and notifies the controller of a sampling result in a case where a sampling processing is performed to the received packet. The controller updates the flow table in accordance with the sampling result and narrows packets to perform a sampling processing.

20 Claims, 5 Drawing Sheets

(56) References Cited

FOREIGN PATENT DOCUMENTS

| JP | 2009-77136 A | 4/2009 |
| WO | WO 2011/030462 A1 | 3/2011 |

OTHER PUBLICATIONS

Curtis et al., "Mahout: Low—Overhead Datacenter Traffic Management using End-Host-Based Elephant Detection", IEEE INFOCOM 2011, Shanghai, CN, IEEE, Piscataway, NJ, USA, Apr. 10, 2011, XP001562384.

English translation of PCT/ISA/237 (written opinion of the international searching authority, dated Apr. 3, 2012).

PCT/IB/373 dated Sep. 24, 2013.

Nick McKeown et al., "OpenFlow: Enabling Innovation in Campus Networks", Mar. 14, 2008, internet (URL: http://www.openflowswitch.org//documents/openflow-wp-latest.pdf).

Curtis et al., "Mahout: Low-Overhead Datacenter Traffic Management using End-Host-Based Elephant Detection", IEEE INFOCOM 2011, Shanghai, CN, IEEE, Piscataway, NJ, USA, Apr. 10, 2011, XP001562384.

International Search Report dated Apr. 3, 2012 (English Translation thereof).

* cited by examiner

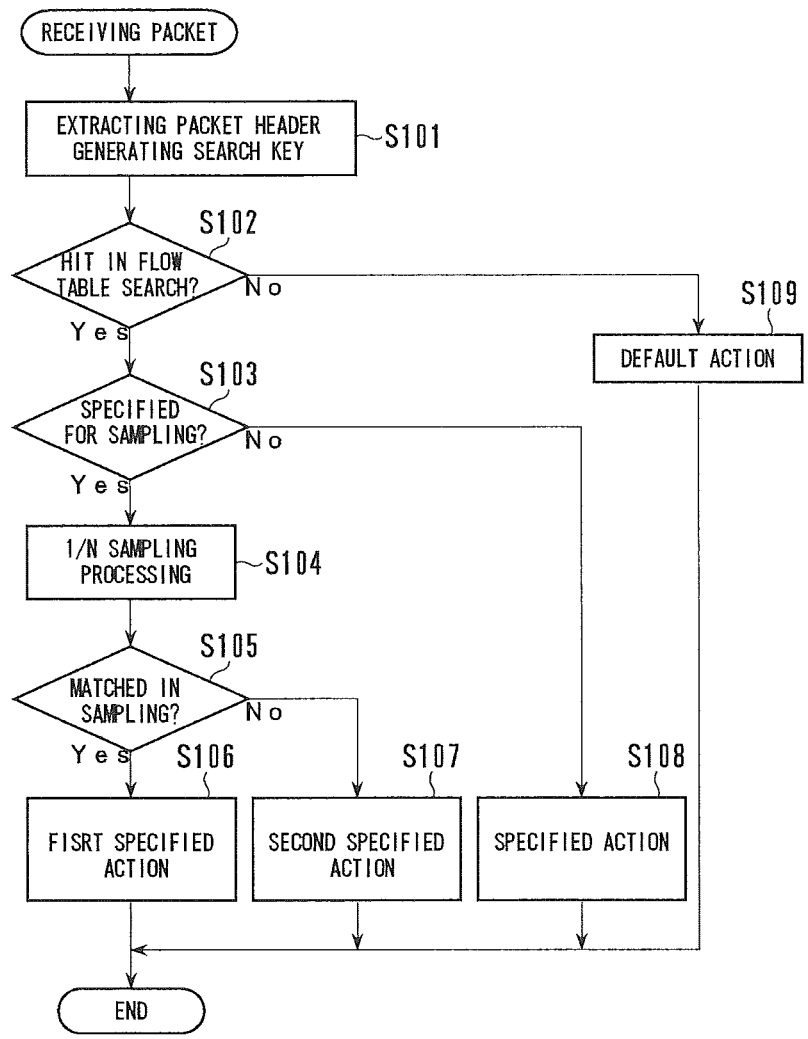

NETWORK SYSTEM AND SWITCHING METHOD THEREOF

TECHNICAL FIELD

The present invention relates to a network system, especially to a network system which performs a packet sampling.

BACKGROUND ART

In a network provided with switching nodes, such as packet switches used in the internet or the like (below referred to as "switches"), different traffics are transferred by packet multiplexing and various abnormalities might occur due to a contamination of traffics with abnormal behavior.

In such a packet network, a method is proposed to define a Flow as a consolidation of traffics related to similar services, define switches per unity of a flow and perform a detailed control of traffics.

As such a traffic controlling method, the OpenFlow Network System can be mentioned, which uses the OpenFlow technology performing a path control of the network by controlling switches from a controller. The OpenFlow technology is disclosed in details by the non-patent literature 1.

It should be noted that an OpenFlow Network System is merely an example of C/U (Control plane/User plane) discrete type network system in which node devices (user plane) are controlled by external controller device (control plane).

[Description about the OpenFlow Network System]

In an OpenFlow Network System, behavior of switches is controlled by operation of controllers such as OFC (OpenFlow Controller) over a flow table of switches such as OFS (OpenFlow Switch). A controller and a switch are connected by a secure channel with which the controller controls the switch by using a control message conforming to the OpenFlow protocol.

A switch in an OpenFlow Network System means an edge switch or a core switch which constitutes the OpenFlow Network System and is under a control of a controller. A sequence of current in an OpenFlow network from a reception of a packet in an edge switch of an input side to a transmission from an edge switch of an output side is defined and a group of packets which comply with this definition is called a flow.

A packet can be read as a frame. A difference between a packet and a frame is only a difference of PDU (Protocol Data Unit), a unit of data handled by a protocol. A packet is the PDU of TCP/IP (Transmission Control Protocol/Internet Protocol). On the other hand, a frame is the PDU of Ethernet (registered trademark).

A flow table is a table in which is registered a flow entry in which is defined a predetermined action to be performed to a packet (communication data) which complies with a predetermined matching condition (rule).

A rule of a flow entry is defined with and can be distinguished by several combinations using some or all of a destination address, a source address, a destination port and a source port, which are included in a header area of each protocol layer of a packet. It should be noted that the above addresses include a MAC (Media Access Control) address and an IP (Internet Protocol) address. Also, in addition to the above, information of an Ingress Port can be used as a flow entry rule.

An action of a flow entry means "outputting to a specified port", "abandoning", "converting a header" or the like. For example, the switch outputs a packet to a corresponding port if identification information (output port number or the like) is shown as a flow entry action or abandons a packet if no identification information of an output port is shown. Or, the switch converts the header of a packet, if header information is shown in a flow entry action, on a basis of the header information.

A switch in an OpenFlow network system executes a flow entry action to a group of packets which complies with a flow entry rule.

A switch in an OpenFlow network system can perform a detailed switching processing per unity of a flow, a traffic control per unity of a flow and a traffic monitoring. However, there is a problem that control targets increase and processing load of the control increase when performing a detailed control to a flow in an architecture in which are logically separated a transfer processing unit, which performs a packet processing such as the OpenFlow, and a control processing unit.

On the other hand, a processing load of the control section can be decreased by increasing a flow granularity (unity of fragmentation); however, a statistic can be taken only per unity of the flow granularity and details of packets set by a switch as a flow and high-speed-transferred can not be monitored.

As an example of a traffic monitoring technique, a packet sampling technique is known. For example, "sFlow", "NetFlow" and the like are known. The traffic monitoring by the packet sampling performs a monitoring of the total traffic by sampling passing packet with a certain probability, monitoring a flow of the packets and deducing the original traffic quantity in accordance with an occurrence probability.

The packet sampling is suitable for a monitoring of a traffic which occupies a large ratio in traffic quantity because of the probability processing and not suitable for a small traffic monitoring.

As an improved method of the above method, a traffic information providing apparatus, a traffic information acquiring apparatus, a traffic information collecting system, a traffic information providing program, a traffic information acquiring program and a traffic information collecting method are disclosed in a patent literature 1 (JP Laid Open Patent Publication 2009-77136).

In the patent literature 1 is suggests to monitor a desired traffic by combining several monitoring with different sampling rates.

However, a traffic control can not be realized by only collecting traffic information with packet sampling. Therefore, a method of combining with a traffic control by switches is desired.

CITATION LIST

Patent Literature

[PLT 1]
JP Laid Open Patent Publication 2009-77136

Non Patent Literature

[NPL 1]
"OpenFlow: Enabling Innovation in Campus Networks", Mar. 14, 2008, Nick McKeown et al., internet (URL: http://www.openflowswitch.org//documents/openflow-wp-latest.pdf)
[NPL 2]
"OpenFlow Switch Specification, Version 1.0.0", Dec. 31, 2009, internet (URL: http://www.openflowswitch.org/documents/openflow-spec-v1.0.0.pdf)

SUMMARY OF INVENTION

A method of performing a detailed flow monitoring is required to a flow switch of an OpenFlow and the like, without increasing the load of the controller.

A network system related to the present invention includes a switch and a controller which sets a flow entry, to which are defined a rule and an action used to uniformly control a packet as a flow, to a flow table of the switch. The switch determines whether or not to perform a sampling processing to a received packet, in accordance with the flow table setting, and notifies the controller of a sampling result in a case where a sampling processing is performed to the received packet. The controller updates the flow table in response to the sampling result, and narrows packets to perform a sampling processing.

A controller related to the present invention comprises a device which sets a flow entry, to which are defined a rule and an action used to uniformly control a packet as a flow, to a flow table of a switch, a device which result a sampling result of performing a sampling processing to a received packet in accordance with the flow table setting and a device which updates the flow table in response of the sampling result and narrows packets to perform a sampling processing.

A switch related to the present invention comprises a device which set a flow entry, to which are defined a rule and an action used to uniformly control a packet as a flow, to a flow table of the switch itself, in response to a control from a controller, a device which determines whether or not to perform a sampling processing to a received packet in accordance with the flow table setting and a device which notifies the controller of a sampling result in a case where a sampling processing is performed to the received packet.

In a switching method related to the present invention, a controller set a flow entry, to which are defined a rule and an action used to uniformly control a packet as a flow, to a flow table of a switch. The switch determines whether or not to perform a sampling processing to a received packet in accordance with the flow table setting, and notifies the controller of a sampling result in a case where a sampling processing is performed to the received packet. The controller updates the flow table in response to the sampling result and narrows packets to perform a sampling processing.

A program related to the present invention is a program to make the controller and the switch to execute the processes in the above switching method. It should be noted that the program related to the present invention can be stored in a recording device or a recording medium.

A flow switch in an OpenFlow and the like can selectively analyze a flow buried in traffic with a large bandwidth and difficult to analyze.

BRIEF DESCRIPTION OF DRAWINGS

FIG. 3 is a flowchart to explain about basic operations of a switch related to the present invention.

DESCRIPTION OF EXEMPLARY EMBODIMENTS

Exemplary Embodiment

Below, will be described an exemplary embodiment of the present invention, by referring attached drawings.

A target of the present invention is a network system of a CU separated-type. Here, an OpenFlow network system, which is one of a network system of a CU separated-type, is taken as an example for explanation. It should be note that, in fact, the present invention is not limited to the OpenFlow network system.

[System Configuration]

Figure 1:
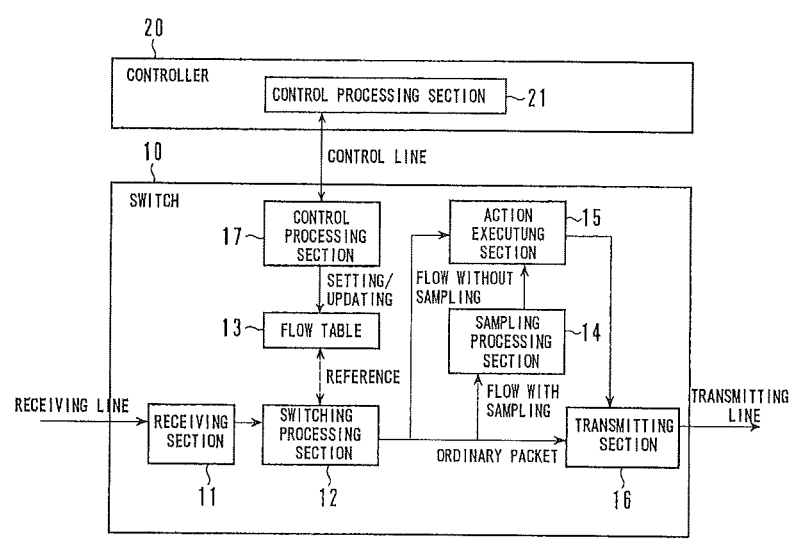
FIG. 1 is a block diagram showing a configuration example of a network system related to the present invention.

As shown in FIG. 1, the network system related to the present invention includes a switch 10 and a controller 20.

The switch 10 is an OpenFlow switch which performs a switching processing on a basis of a flow table.

The controller 20 is an OpenFlow controller which set a flow table and controls a behavior of the switch. For example, the controller 20 is a server apparatus which executes software to implement functions as an OpenFlow controller.

The switch 10 and the controller 20 are connected via a control line. The control line is used to transmit and receive control messages complying with an OpenFlow protocol.

[Switch Configuration]

The switch 10 has a receiving section 11, a switching processing section 12, a flow table 13, a sampling processing section 14, an action executing section 15, a transmitting section 16 and a control processing section 17.

The receiving section 11 receives a packet from outside via a receiving line. The receiving line exists with a number of interfaces (input ports number) the receiving section 11 has. The receiving section 11 receives a packet via the receiving line and passes the received packet to the switching processing section 12.

The switching processing section 12 stores the received packet in a buffer, extracts a header field value of the received packet and generates a search key of the flow table 13 on a basis of the extracted header field value. The switching processing section 12 uses the generated search key to perform a search in the flow table 13. In a case where the search key hits (corresponds) to any one of flow entries in the flow table 13, the switching processing section 12 sends the received packet to one among the sampling processing section 14, the action executing section 15, the transmitting section 16 or the control processing section 17, in accordance with an action of the flow entry. The action of the flow entry can be specifying an output port, converting an output packet header, outputting to the control line or abandoning a packet, etc. It should be noted that the outputting port means a transmitting port.

Here, the switching processing section 12 passes the received packet to the sampling processing section 14 in a case where "sampling instruction: yes" is specified as the flow entry action of the flow table 13. That is, a sampling processing is performed to the received packet. Or, in a case where "sampling instruction: no" is specified as the flow entry action of the flow table 13, the switching processing section 12 passes the received packet to the action executing section 15. That is, a sampling processing is not performed to the receiving packet and a determined action is executed. Furthermore, the switching processing section 12 passes the received packet to the transmitting section 16 in a case where there is no corresponding flow in the flow table 13. That is, the received packet is outputted as an ordinary packet which corresponds to no flow.

In the flow table 13 is set a set of a header field value of a packet which shows a flow and an action, as a flow entry. Here, the header field value of the packet is a rule of the flow entry. It should be noted that a flow entry rule can be set in the flow table 13 by explaining a part (or the whole) of the header field value of a packet showing a flow with a regular expression or a wild card such as "*".

The sampling processing section 14 performs a sampling of packet with a specified sampling rate. For example, the sampling processing section 14 collects one packet at a certain interval (every a certain time, every a certain number of packets) to perform a statistic analysis. Then, the sampling processing section 14 passes the packet to the action executing section 15. Here, the sampling processing section 14 can pass a sampling result to the action executing section 15 with the packet.

The action executing section 15 executes a determined action to the packet. For example, the action executing section 15 performs a conversion of a header, transmission to a predetermined transmitting line or abandon of the packet, as the action to the packet. Here, the action executing section 15 can, independently, extract a header field of the packet, search in the flow table 13 on a basis of the extracted header field, determine the action to the received packet and execute the determined action. Or, the action executing section 15 can also, in a case where a sampling result is received with the packet from the sampling processing section 14, change the action to the packet in response to the sampling result.

The transmitting section 16 transmits a packet to outside via a transmitting line. The transmitting line exists with a number of interfaces (output ports number) the transmitting section 16 has. It should be noted that one of the output ports of the transmitting section 16 can be connected to the controller 20 via a control line. In this case, there is on the controller 20 side an input port corresponding to the output port of the transmitting section 16. That is, the transmitting section 16 outputs an output packet to the transmitting line and the control line.

The control processing section 17 controls the operations of whole the switch. Also, the control processing section 17 performs transmissions and receptions of control messages with the controller 20 and performs a setting of the flow table 13 in accordance with a control message from the controller 20.

[Controller Configuration]

The controller 20 has a control processing section 21.

The control processing section 21 controls operations of whole the controller. Also, the control processing section 21 performs transmissions and receptions of control messages with the switch 10 and performs a setting of the flow table 13 in the switch 10 by use of a control message. For example, a control message such as flow updating (Flow Mod) is used to perform a registration or an update of the flow entry to the flow table 13 in the switch 10. That is, the control processing section 21 performs processes related to controls of the switch 10.

The control processing section 21 receives control messages such as packet information or packet inquiry via the control line, determines whether or not to transfer the packet, and in a case of allowing the transfer of the packet, determines the content of a transferring process of the switch 10 and performs a setting of the flow table 13 via the control processing section 17 in the switch 10.

[Two Flow Entry Registering Methods]

In an OpenFlow network system, methods of registering a flow entry in a flow table of a switch are classified in two big types: the first is "Proactive type" and the second is "Reactive type".

In a case of the "Proactive type", the controller calculates a path of a determined group of packets (flow) "in advance (before data communication begins)" and registers a flow entry in the flow table of the switch. That is, what is called here the "Proactive type" points at the "flow entry registering in advance" that the controller independently performs.

In a case of the "Reactive type", the controller calculates a path of a corresponding group of packets (flow) when receiving an inquiry from the switch about a first packet (a new packet with no corresponding flow entry) and registers a flow entry in the flow table of the switch. That is, what is called here the "Reactive type" points at the "real time flow entry registering" that the controller performs in response to an inquiry from the switch.

In the present invention, any one of the "Proactive type" or the "Reactive type" can be used.

In a case of adopting the "Proactive type", the control processing section 21 of the controller 20 determines in advance (before data communication begins), a header field value to identify a determined packet which is expected to arrive at the switch 10 and an action to be executed to this packet and used a control message to perform a setting of the flow table of the switch 10.

In a case of adopting the "Reactive type", the control processing section 21 of the controller 20 determines, when receiving an inquiry from the switch 10 about a packet, a header field value to identify this packet and an action to be executed to this packet and uses a control message to perform a setting of the flow table 13 of the switch 10.

Hardware Example

A detailed example of hardware to implement the network system related to the present invention will be described below.

As an example of the switch 10, can be considered a network switch, a router, a proxy, a gateway, a firewall, a load balancer, a packet shaper, a SCADA (Supervisory Control And Data Acquisition), a gatekeeper, a base station, an AP (Access Point), a CS (Communication Satellite) or a computer having a plurality of communication ports, etc. The switch 10 can also be a virtual switch realized by a VM (Virtual Machine) constructed in a physical machine.

As an example of the controller 20, is assumed a computer such as a PC (Personal Computer), an appliance, a thin client server, a work station, a main frame, a super computer and the like. The controller 20 can also be an expansion board mounted on a computer or a VM (Virtual Machine) constructed in a physical machine.

The switch 10 and the controller 20 are realized by a processor which drives on a basis of a program to execute predetermined processes, a memory which stores the program and data of each kind and a communication I/F (Interface) to connect to a network.

As an example of the above processor, can be considered a CPU (Central Processing Unit), a NP (Network Processor), a microprocessor, a microcontroller, a LSI (Large Scale Integration) and the like.

As an example of the above memory, can be considered a semiconductor memory device such as a RAM (Random Access Memory), a ROM (Read Only Memory), an EEPROM (Electrically Erasable and Programmable Read Only Memory) or a flash memory, an auxiliary storage device such as a HDD (Hard Disk Drive) or a SSD (Solid State Drive), a removable disk such as a DVD (Digital Versatile Disk) or a storage medium such as a SD card (Secure Digital memory card).

It should be noted that the above processor and the above memory can be integrated. For example, integration of a microcomputer and the like into a one-chip is in progress. Therefore, cases can be considered where a one-chip microcomputer mounted on a computer or the like has a processor and a memory.

As an example of the above interface for communication, can be considered a semiconductor integrated circuit such as aboard corresponding to a network communication (mother board, I/O board) and a chip, a network adaptor such as a NIC (Network Interface Card) and similar expansion card, a communication device such as an antenna, a communication port such as a connector, and the lie.

Also, as an example of the network, can be considered internet, LAN (Local Area Network), wireless LAN, WAN (Wide Area Network), Backborn, a cable TV line, fixed telephone network, mobile telephone network, WiMAX (IEEE 802.16a), 3G (3rd Generation), a lease line, IrDA (Infrared Data Association), Bluetooth (registered trademark), a serial communication line, a data bus and the like.

As an example of the receiving section 11 and the transmitting section 16, the above communication interface is assumed.

As an example of the switching processing section 12, the sampling processing section 14, the action executing section 15, the control processing section 17 and the control processing section 21, the above processor is assumed. It should be noted that the switching processing section 12, the sampling processing section 14, the action executing section 15, the control processing section 17 and the control processing section 21 can be a combination of the above processor and the above memory. Especially, the control processing section 17 and the control processing section 21 can be a combination of the above processor, the above memory and the above communication interface. The switching processing section 12, the sampling processing section 14, the action executing section 15, the control processing section 17 and the control processing section 21 can also be a module, a component, an exclusive device or a program to start/call those devices up.

As an example of a memory area to store the flow table 13, the above memory is assumed.

It should be noted that, in fact, the present invention is not limited by the above examples.

[Basic Concept]

Figure 2:
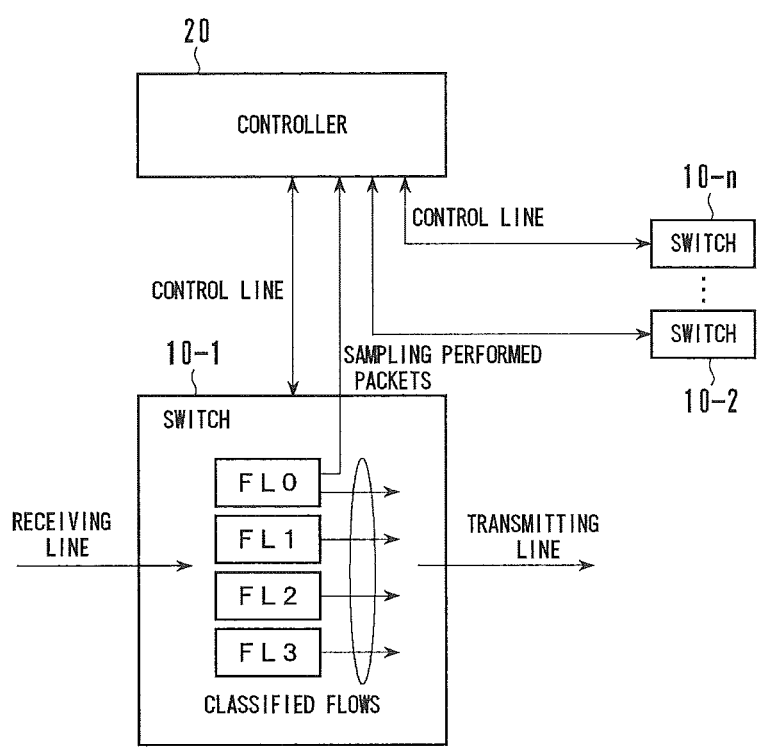
FIG. 2 is a diagram to explain about an exemplary embodiment of a network system related to the present invention.

FIG. 2 is referred to explain about a relationship between the switch, the controller and the flow and the concept of an operation when a plurality of flow entries is set in the switch.

In FIG. 2, the network includes switches 10 (10-$i$, $i$=1 to n, n=number of switches) and a controller 20.

Each of the switches 10 (10-$i$, $i$=1 to n) is same as the switch 10 disclosed above. The controller 20 is same as the controller 20 disclosed above.

Each of the switches 10 (10-$i$, $i$=1 to n) is connected to the controller 20 via a control line and sets the flow table 13 in accordance with a flow table setting instruction (control message) from the controller 20.

Each switch 10 uses a combination of a header field value of a packet received from the receiving line as a search key to perform a search in the flow table 13, classifies to a corresponding flow if there is a hit flow entry and executes an action specified by the flow entry.

Here, the switch 10-1 classifies received packets into FL0 to FL 3. It should be noted that FL shows a flow. To those flows (FL0 to FL3) are specified, as an action, a purport or an indication to perform a sampling (sampling processing) and a predetermined output port (output action).

The switch 10-1 applies to FL0, among those FL0 to FL3, a sampling processing and transfers information of a packet which matches to a packet sampling target with a probability of 1/N (sample packet information) to the controller 20 via a control line. That is, the switch 10-1 collect packets of FL0 with a rate of one packet every N packets, and transfers information of collected packets to the controller 20 via the control line. It should be noted that the switch 10-1 can transfer a packet copied (duplicated) from a collected packet (sample packet) as information of collected packet to the controller 20 via the control line.

The switch 10-1 applies an action similar to the output action of FL0 to each of FL0 to FL3, outputs a packet to an indicated output port to transmit to the transmitting line via the output port.

Switches 10 other than the switch 10-1 perform processes similar to the above too, transfer information of a packet of a flow corresponding to FL0 (packet matched to packet sampling target) to the controller 20 via the control line, and transmit a packet of a flow corresponding to FL1 to FL 3 (packet not matched to packet sampling target) to the transmitting line from the output port.

Here, flows FL1 to FL3 are a group of flows included in a flow set of FL0. That is, each of FL0 to FL3 shows packets belonging to the flow set of FL0.

FIG. 3 is referred to explain about basic operations of the switch.

(1) Step S101

The switch 10 receives a packet, extracts a header field value of the received packet and generates a search key to search a flow.

(2) Step S102

The switch 10 uses the search key to search in the flow table.

(3) Step S103

The switch 10 verifies, in a case where the search key hits to any one of flow entries of the flow table 13 (Yes in Step S102), whether or not there is a specification of sampling indicated as an action of a hit flow entry.

(4) Step S104

The switch 10 performs, in a case where there is a specification of sampling (Yes in Step S103), a sampling processing to the flow with a specified sampling rate (1/N). That is, the switch 10 counts packets of the flow and performs a sampling of one packet every N packets.

(5) Step S105

The switch 10 verifies whether the packet matches with packet sampling target. That is, the switch 10 verifies whether the packet is one packet among N packets.

(6) Step S106

The switch 10 executes, in a case where the packet matches with the packet sampling target, a first specified action. For example, as the first specified action, in a case where a packet transfer to the controller 20 is specified, the switch 10 transfers information of a packet included in the flow to the controller 20 with a probability of 1/N. The controller 20 analyzes information of the packet, performs, in a case of traffic with a big quantity of flow, an update of the setting of the flow entry 13 in the switch 10 (adding/updating the flow entry) and excludes unnecessary traffics from the sampling target. Consequently, the controller 20 narrows traffics of sampling target and selectively extracts traffics.

(7) Step S107

The switch 10 executes, in a case where the packet does not match with the packet sampling target, a second specified action. For example, in a case where an output to a predetermined port is prescribed as the second specified action, the switch 10 outputs the flow to the port and transmits to the transmitting line.

(8) Step S108

The switch 10 transfers the packet, in a case of no sampling indication (No in the step S103), in accordance with a specified action.

(9) Step S109

Also, the switch 10 transfers the packet, in a case where the search key hits no flow entry of the flow table 13 (No in the step S102), in accordance with an action of a predetermined default entry (default action).

It should be noted that the default entry is a flow entry of an initial setting targeting packets of an unspecified number (or all the packets). The unspecified number of packets can be targeted by expressing a portion (or the whole) of header field value of packets, which shows a flow, with regular expression or wild cards such as "*". The default entry has a lower priority; if there is other flow entry which is hit, the hit flow entry takes precedence. That is, the default entry is a flow entry which is hit only in a case where no hit flow entry exists. A packet which is hit in the default entry is an ordinary packet which corresponds to no flow.

For example, in a case a packet transfer to the controller 20 is prescribed as the default action, the switch 10 transfers a packet, which does not hit in the flow table 13 and in unknown about transferring process, to the controller 20. The controller 20 performs processes to the packet and, in accordance with necessity, performs a process of setting the flow table 13 of the switch 10 ("Reactive type").

Or, in a case where an output to a certain port is prescribed as the default action, the switch 10 output the packet to the port and transmits to the transmitting line ("Proactive type").

[Only Initial Flow]

Figure 4A:
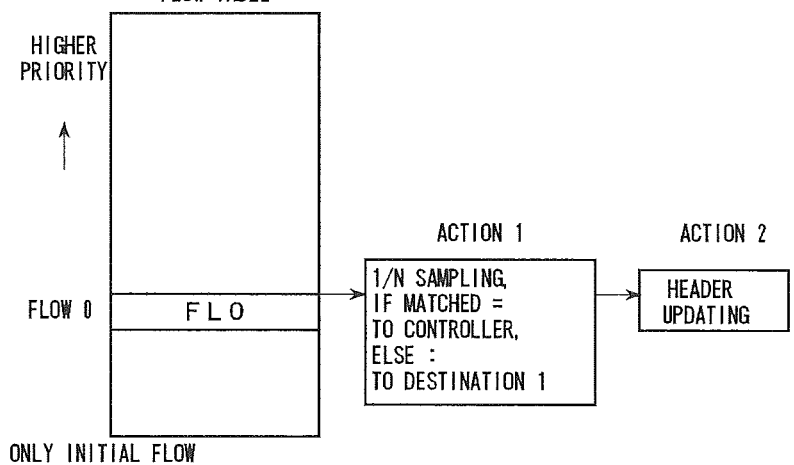
FIG. 4A is a diagram showing a state in which one flow is set as an initial flow.

FIG. 4A is referred to explain about a state where one flow is set as an initial flow.

A flow entry corresponding to FL0 is set in the flow table 13. In the flow entry corresponding to FL0, "Action 1" is defined as "transfer to the controller 20 in a case of matching to the packet sampling target with a sampling rate (1/N); output to the output destination 1 in a case of not matching". Furthermore, "Action 2" is defined as "perform header converting" when outputting.

Therefore, the switch processing section 12 transfers a received packet which hits the flow entry corresponding to FL0, to the controller 20 in a case of matching with the packet sampling target with the sampling rate (1/N) and to the output destination 1 in a case of no matching. Furthermore, "header converting" is performed as "Action 2" when outputting.

FL0 shows a set of a certain network address group. It is assumed that, for example, a set of flows from a network such as "IPSA (Internet Protocol Source Address)=10.0.0.0/8" hits the flow entry corresponding to FL0 and furthermore can be divided into a plurality of flow sets.

[Initial Flow+Flow without Sampling]

Figure 4B:
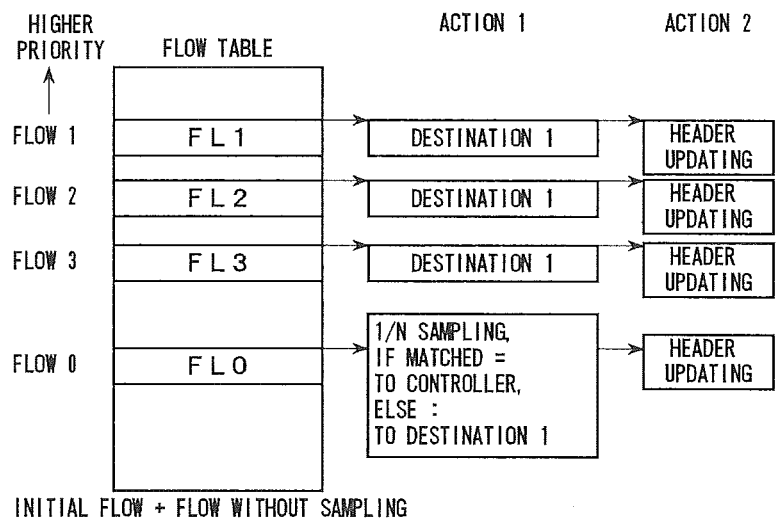
FIG. 4B is a diagram showing a state in which an initial flow and a flow without sampling are set.

FIG. 4B is referred to express about a state where a flow, excluded from sampling target as FL1, in accordance with information of packet sent to the controller 20 from FL0 by sampling, is set in the flow table 13.

FL1 is set in the flow table 13 as a flow entry with a higher priority than the flow entry of FL0. A received packet hits to the flow entry corresponding to FL1 even in a case of being included in both FL0 and FL1. In the flow entry corresponding to FL1, "output to output destination 1" is defined as the "Action 1". Furthermore, "perform header converting" is defined as the "Action 2" when outputting.

Therefore, the switching processing section 12 outputs all the received packets which hit the flow entry corresponding to FL1 without performing a sampling processing to the output destination 1. Furthermore, the "header converting" is performed as the "Action 2" when outputting.

By performing the above, among packets included in FL0, a flow with a big bandwidth and easy to match with the packet sampling target can be excluded from sampling target as FL1.

Similarly, by setting packets sent to the controller 20 by sampling as FL2 and FL3, flows which are not target of sampling, a traffic hitting to a flow entry of FL0 becomes a set of relatively few traffic quantity; and by analyzing this traffic by the controller 20 or an analyzing device, detailed (segmentalized) flow check becomes possible.

That is, to exclude packets which are not target of sampling from the beginning among packets hitting the flow entry of FL0, flow entries of FL1 to FL3 are used. Specifically, a sampling is performed to packets which remain from excluding "packets hitting to flow entries of FL1 to FL3" from "packets hitting to the flow entry of FL0".

Therefore, among flow entry rules, flow entry rules of FL1 to FL3 are more limitative in header field value of packet showing a flow than a flow entry rule of FL0.

For example, in a case the flow entry rule of FL0 is "IPSA=10.0.0.*/8", "packets hitting flow entries of FL1 to FL3" can be excluded from "packets hitting the flow entry of FL0" by setting the flow entry rule of FL1 as "IPSA=10.0.0.1/8", the flow entry rule of FL2 as "IPSA=10.0.0.2/8" and the flow entry rule of FL3 as "IPSA=10.0.0.3/8".

Here, a magnitude relation of flow entry priority is "default entry<FL0<FL1 to FL3". The magnitude relation of flow entry priority of "FL1 to FL3" depends on a setting.

Figure 5:
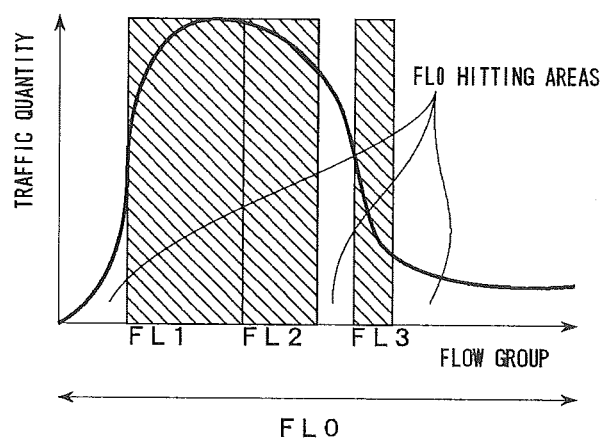
FIG. 5 is a diagram showing an example of traffic quantity distribution of FL0, FL1, FL2 and FL3.

FIG. 5 is referred to explain about an example of traffic quantity distribution of FL0, FL1, FL2 and FL3.

A curve in FIG. 5 shows a distribution of traffic quantity in a case where header combination in a flow set of FL0 is taken in the horizontal axis and each traffic quantity is taken in the vertical axis.

Here, the switch 10 transmits packets to the controller 20 by sampling FL0. As a result, the controller 20 sets flow entries such as FL1, FL2 and FL3 in the flow table 13 in the switch 10. By performing as above, areas which are not included in FL1, FL2 and FL3 among the flow set of FL0 becomes the target of FL0.

By analyzing those traffics (of FL0, FL1, FL2 and FL3), it is possible to selectively analyze flows buried in a traffic with a big bandwidth and difficult to analyze.

The switch 10 changes the destination in a packet transferring process in accordance with matching of flow (in a case of hitting in flow entry) and matching of packet sampling (in a case of matching in packet sampling).

Especially, the switch 10 transfers a packet which matches in a packet sampling to the controller 20.

The controller 20 sets the flow entry in the flow table 13 of the switch 10 on a basis of flow information obtained by sampling and excludes from sampling target to limit the sampling target to traffics of finer flows.

SUMMARY

As disclosed above, in the present invention, the switch transmits a control message including information of packets extracted by sampling processes to the controller. The controller analyzes the received message and excludes, in a case of traffics with a big quantity of flow, unnecessary traffics from sampling targets by setting flow entries of the switch. By narrowing traffics of sampling target, the controller can selectively extract fines traffics and it becomes possible to selectively switch corresponding flows to an abnormality detecting apparatus or the like (switching transfer destination to an abnormality detecting apparatus or the like).

APPENDIX

A part or the whole of above exemplary embodiments can also be described as appendixes below. It should be noted that, in fact, the present invention is not limited by the below described examples.

Appendix 1

A controller comprising:

a device configured to set a flow entry, to which are defined a rule and an action used to uniformly control a packet as a flow, in a flow table of a switch;

a device configured to receive a sampling result of a sampling processing performed to a received packet, from said switch, in accordance with said flow table setting; and a device configured to update said flow table in response to said sampling result and narrow packets to perform a sampling processing.

Appendix 2

The controller according to Appendix 1 further comprising:

a device configured to set a flow entry related to a flow to perform a sampling processing, a flow entry related to a flow not to perform a sampling processing and a default entry related to an ordinary packet corresponding to no flow to said flow table.

Appendix 3

The controller according to Appendix 2 further comprising:

a device configured to set a flow entry related to a flow newly excluded of a sampling processing from packets to perform a sampling processing in a flow table, on a basis of information of a packet notified by said switch, and in a higher priority than a flow entry related to a flow to perform a sampling processing, and exclude a packet corresponding to a flow excluded of a sampling processing from packets corresponding to flows to perform a sampling processing.

Appendix 4

A switch comprising:

a device configured to set a flow entry, to which are defined a rule and an action used to uniformly control a packet as a flow, in a flow table of said switch, in response to a control from a controller;

a device configured to determine whether or not to perform a sampling processing to a received packet, in accordance with said flow table setting; and a device configured to notify said controller of a sampling result in a case where a sampling processing is performed to said received packet.

Appendix 5

The switch according to Appendix 4 further comprising:

a device configured to classify a received packet as a packet corresponding to a flow to perform a sampling processing, a packet corresponding to a flow not to perform a sampling processing or an ordinary packet corresponding to no flow;

a device configured to notify said controller of information of a packet corresponding to a flow to perform a sampling processing; and a device configured to convert header information of a packet corresponding to a flow to perform a sampling processing and a packet corresponding to a flow not to perform a sampling processing.

Appendix 6

The switch according to Appendix 5 further comprising:

a device configured to set a flow entry related to a flow newly excluded of a sampling processing from flows to perform a sampling processing in a flow table, in response to a control from a controller on a basis of a packet information and in a higher priority than a flow entry related to a flow to perform a sampling processing; and a device configured to exclude a packet corresponding to a flow excluded of a sampling processing from packets corresponding to flows to perform a sampling processing in accordance with said flow table setting.

<Remarks>

The exemplary embodiments of the present invention have been disclosed above; but in fact, the present invention is not limited by the above exemplary embodiments and includes several variations in a scope not to depart from the essentials of the present invention.

It should be noted that the present invention claims the priority based on Japanese Patent Application 2011-060389 and so the disclosures of Japanese Patent Application 2011-060389 is incorporated in the present invention by this reference.

The invention claimed is:

1. A network system, comprising:
a switch; and
a controller configured to set a flow entry, in which are defined a rule and an action used to uniformly control a packet as a flow, in a flow table of said switch, the rule indicating a header field value of the packet, the action at least specifying whether sampling instruction is to be performed,
wherein said switch determines whether or not a sampling processing section performs a sampling processing to a received packet as a sampled packet, in accordance with a flow table setting, and notifies said controller of information on said sampled packet in a case where a sampling processing has been performed to said received packet, and
wherein said controller updates said flow table on a basis of analysis of said notified information on said sampled packet and narrows packets to perform said sampling processing.

2. The network system according to claim 1, wherein said controller comprises:
means configured to set a flow entry related to a flow to perform a sampling processing, a flow entry related to a flow not to perform a sampling processing and a default entry related to an ordinary packet which corresponds to no flow, and wherein said switch comprises:
means configured to classify the received packet as a packet corresponding to a flow to perform a sampling processing, a packet corresponding to a flow not to perform a sampling processing, or an ordinary packet corresponding to no flow;
means configured to notify said controller of information of a packet corresponding to a flow to perform said sampling processing;
means configured to convert header information of both a packet corresponding to a flow to perform said sampling processing and a packet corresponding to a flow not to perform said sampling processing; and
means configured to output a packet.

3. The network system according to claim 2, wherein said controller further comprises:
means configured to set a flow entry related to a flow, which is newly excluded from a sampling processing from flows to perform said sampling processing, in said flow table, on a basis of information of a packet notified from said switch, in a higher priority than a flow entry related to a flow to perform said sampling processing, and exclude a packet corresponding to a flow excluded of said sampling processing from packets corresponding to flows to perform said sampling processing.

4. A controller, comprising:
means configured to set a flow entry, in which are defined a rule and an action used to uniformly control a packet as a flow, in a flow table of a switch, the rule indicating a header field value of the packet, the action at least specifying whether sampling instruction is to be performed;
means configured to receive information on a sampled packet from said switch in a case where sampling processing means performs a sampling processing to a received packet as the sampled packet in accordance with a flow table setting; and
means configured to update said flow table on a basis of analysis of notified information on said sampled packet and narrow packets to perform the sampling processing.

5. A switch, comprising:
means configured to set a flow entry, in which are defined a rule and an action used to uniformly control a packet as a flow, to a flow table of said switch in response to a control from a controller, the rule indicating a header field value of the packet, the action at least specifying is to be performed;
means configured to determine whether or not sampling processing means performs a sampling processing to a received packet as a sampled packet in accordance with a flow table setting; and
means configured to notify said controller of information on said sampled packet in a case where the sampling processing is performed to said received packet.

6. A switching method, comprising:
a controller setting a flow entry, in which are defined a rule and an action used to uniformly control a packet as a flow, in a flow table of a switch, the rule indicating a header field value of the packet, the action at least specifying whether sampling instruction is to be performed;
said switch determining whether or not a sampling processing section performs a sampling processing to a received packet as a sampled packet in accordance with a flow table setting, and notifying said controller of information on said sampled packet in a case where a sampling processing has been performed to said received packet; and said controller updating said flow table on a basis of analysis of said notified information on said sampled packet, and narrowing packets to perform said sampling processing.

7. The switching method according to claim 6, further comprising:
said controller setting a flow entry related to a flow to perform a sampling processing, a flow entry related to a flow not to perform a sampling processing and a default entry related to an ordinary packet related to no flow in said flow table;
said switch classifying the received packet as a packet corresponding to a flow to perform a sampling processing, a packet corresponding to a flow not to perform a sampling processing or an ordinary packet corresponding to no flow in accordance with said flow table setting;
said switch notifying said controller of information of a packet corresponding to a flow to perform said sampling processing;
said switch converting header information of a packet corresponding to a flow to perform said sampling processing and a packet corresponding to a flow not to perform said sampling processing; and
said switch outputting a packet.

8. The switching method according to claim 7, further comprising:
said controller setting a flow entry related to a flow, which is newly excluded of a sampling processing from flows to perform said sampling processing, in said flow table, on a basis of information of a packet notified from said switch, and in a higher priority than a flow entry related to a flow to perform said sampling processing; and
said controller excluding a packet corresponding to a flow excluded of said sampling processing from packets corresponding to flows to perform said sampling processing.

9. A non-transitory recording medium in which a program is stored to make a controller to execute a method comprising:
setting a flow entry, in which are defined a rule and an action used to uniformly control a packet as a flow, in a flow table of a switch, the rule indicating a header field value of the packet, the action at least specifying whether sampling instruction is to be performed;
receiving information on a sampled packet of a sampling processing performed to a received packet as the sampled packet in accordance with a flow table setting from said switch; and
updating said flow table on a basis of analysis of said notified information on said sampled packet and narrowing packets to perform said sampling processing.

10. A non-transitory recording medium in which a program is stored to make a switch to execute a method comprising:
setting a flow entry, in which are defined a rule and an action used to uniformly control a packet as a flow, in a flow table of said switch, in response to a control from a controller, the rule indicating a header field value of the packet, the action at least specifying whether sampling instruction is to be performed;
determining whether or not a sampling processing section performs a sampling processing to a received packet as a sampled packet, in accordance with a flow table setting; and
notifying said controller of information on said sampled packet in a case where said sampling processing has been performed to said received packet.

11. The network system according to claim 1, wherein said switch comprises:

means configured to classify said received packet as a packet corresponding to no flow or a packet corresponding to a flow not to perform a sampling processing.

12. The network system according to claim 1, wherein said switch is configured to classify said received packet as a packet corresponding to no flow or a packet corresponding to a flow not to perform a sampling processing.

13. The network system according to claim 1, wherein said controller is configured to analyze information of said received packet, to perform, in a case of a traffic with a predetermined quantity of flow, an update of a setting of the flow entry in said switch, and to exclude unnecessary traffics from a sampling target.

14. The network system according to claim 13, wherein said controller is further configured to narrow traffics of the sampling target and to selectively extract the traffics.

15. The switching method according to claim 6, further comprising:
said switch classifying the received packet as a packet corresponding to a flow not to perform a sampling processing or a packet corresponding to no flow in accordance with said flow table setting.

16. The switching method according to claim 6, wherein said controller is configured to analyze information of said received packet, to perform, in a case of a traffic with a predetermined quantity of flow, an update of a setting of the flow entry in said switch, and to exclude unnecessary traffics from a sampling target.

17. The switching method according to claim 16, wherein said controller is further configured to narrow traffics of the sampling target and to selectively extract the traffics.

18. The non-transitory recording medium according to claim 9, said method further comprising:
said switch classifying the received packet as a packet corresponding to a flow to perform a sampling processing, a packet corresponding to a flow not to perform a sampling processing, or a packet corresponding to no flow in accordance with said flow table setting.

19. The non-transitory recording medium according to claim 9, said method further comprising:
said switch classifying said received packet as a packet corresponding to a flow not to perform a sampling processing or a packet corresponding to no flow in accordance with said flow table setting.

20. The non-transitory recording medium according to claim 9, wherein said controller is configured to analyze information of said received packet, to perform, in a case of a traffic with a predetermined quantity of flow, an update of a setting of the flow entry in said switch, and to exclude unnecessary traffics from a sampling target, and
wherein said controller is further configured to narrow traffics of the sampling target and to selectively extract the traffics.

* * * * *